(No Model.)
C. R. MULLEN.
SHIRT COLLAR FASTENER.
No. 599,530. Patented Feb. 22, 1898.
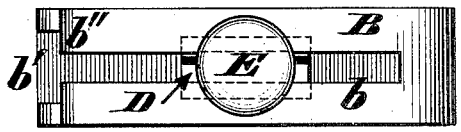
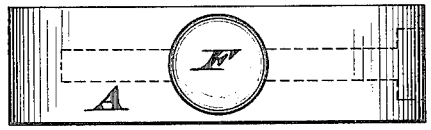
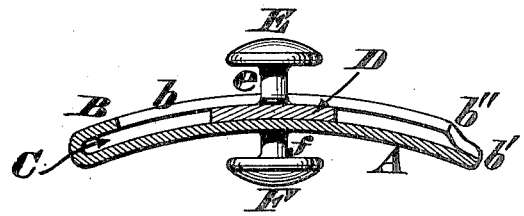
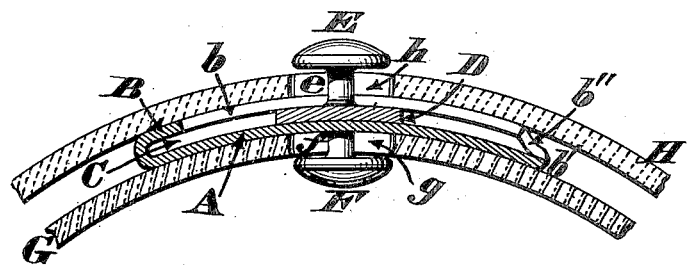
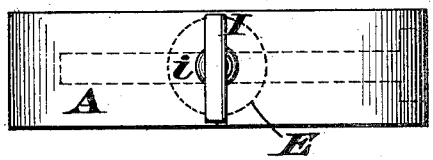
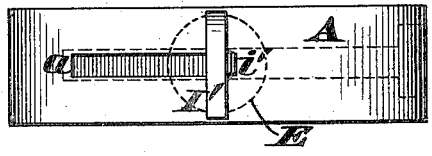
Attest.
Ida Heitz
Samuel M Quinn
Inventor.
Charles R. Mullen
by James H. Layman.
Atty.

UNITED STATES PATENT OFFICE.

CHARLES R. MULLEN, OF CINCINNATI, OHIO, ASSIGNOR OF ONE-HALF TO HENRY H. KLOCK, OF SAME PLACE.

SHIRT-COLLAR FASTENER.

SPECIFICATION forming part of Letters Patent No. 599,530, dated February 22, 1898.

Application filed June 1, 1897. Serial No. 638,969. (No model.)

*To all whom it may concern:*

Be it known that I, CHARLES R. MULLEN, a citizen of the United States, residing at Cincinnati, in the county of Hamilton and State of Ohio, have invented certain new and useful Improvements in Shirt-Collar Fasteners; and I do hereby declare the following to be a full, clear, and exact description of the invention, reference being had to the annexed drawings, which form a part of this specification.

My invention comprises a cheap, simple, and handy fastener for readily attaching a shirt-collar to the back of a neckband, the fastener being provided with a front stud that engages with said band and having a rear stud that connects with the collar. This front stud is a fixture; but the rear stud is capable of a slight movement longitudinally of the fastener. Consequently if the back buttonhole of a collar is not exactly opposite its front buttonhole the rear stud can be moved along the fastener either to the right or left and thereby be adjusted to a position that will insure a correct fit of the collar; but the front stud is incapable of shifting either to the right or left or up or down, and for this reason the fastener and its attached collar are securely retained against vertical play, as hereinafter more fully described.

In the annexed drawings, Figure 1 is a rear elevation of the preferred form of my shirt-collar fastener. Fig. 2 is a front elevation thereof. Fig. 3 is a horizontal section of said fastener. Fig. 4 is a similar section, but showing the fastener engaged with a neckband and collar. Figs. 5 and 6 show two different modifications of the invention.

The principal member of my fastener includes a pair of light parallel plates A B, having a slight curvature from end to end, as seen in Figs. 3 and 4, a race C being arranged between these plates for the free longitudinal play of a slide D, carrying the rear stud or button or equivalent device E. This stud is connected to said slide by a shank $e$, the latter being sufficiently long to pass through a shirt-collar. Furthermore, this shank $e$ traverses a longitudinal slot $b$ of the rear plate B, which slot has at one end an enlargement $b'$, that permits the convenient insertion of slide D within the curved race C, after which act said plate is flattened down against the other plate A, as at $b''$, for the purpose of preventing accidental detachment of said slide. Projecting from this front plate A is a fixed stud F, the shank of which, $f$, is sufficiently long to pass through a shirt-neckband. G in Fig. 4 is such a band, and $g$ a buttonhole of the same. H in the same illustration is a shirt-collar, and $h$ a buttonhole of the same.

To use my fastener, its front stud F is first passed through the buttonhole $g$ of the neckband G, after which act the rear stud E is engaged with the buttonhole $h$ of the shirt-collar H. The ends of the collar are then fastened with a front button in the usual manner, and if the rear buttonhole $h$ is not directly opposite said front button the stud E can be shifted either to the right or left of the race C, and thus be adjusted to a position that insures a correct fitting of the collar; but this stud E is incapable of any vertical movement, and therefore the collar cannot work up or down.

The above describes the preferred form of my fastener; but the details of the same may be varied, especially the means for attaching it to a neckband, one evident modification of such means being seen in Fig. 5. Here a vertical bar I is rigidly fastened to the plate A by a shank $i$ and is to be engaged with a horizontal buttonhole. To effect this engagement, the plate A is turned vertically, so as to enable the now horizontal bar I to be passed through said hole, and then said plate is swung down to its normal position, thereby securing the fastener to the neckband.

In Fig. 6 the plate A is slotted at $a$, and the cross-bar I', together with its shank $i'$, is made out of the metal thus cut from said plate; or the stud F can be so arranged as to be brought to a horizontal position before being passed through the buttonhole $g$, and then said stud can be again turned up vertically.

It is evident the above-described modifications embody the leading feature of my invention—that is to say, they show a fastener having immovably secured to its front a device capable of being readily engaged with a neckband-buttonhole, while at rear said fastener has a movable but undetachable stud that can be inserted in a collar-buttonhole.

Finally, the fastener has been drawn on a greatly-enlarged scale to render its construction perfectly clear, but in actual practice the slot *b* is only about half an inch long and the other parts are proportioned accordingly.

I claim as my invention—

1. A shirt-collar fastener having immovably secured to its front a device capable of being engaged with a neckband-buttonhole; and at rear a movable, but undetachable stud, that can be engaged with a collar-buttonhole, substantially as herein described, and for the purpose stated.

2. A shirt-collar fastener consisting of a plate A, having a fixed stud F projecting from its front; a rear plate B, slotted longitudinally at *b;* a race C, between said plates; a slide D traversing said race; and an undetachable stud E, having a shank *e* secured to said slide, and movable along said slot *b*, all as herein described, and for the purpose stated.

In testimony whereof I affix my signature in presence of two witnesses.

CHARLES R. MULLEN.

Witnesses:
JAMES H. LAYMAN,
JOHN C. ROGERS.